United States Patent
Syrjärinne et al.

(10) Patent No.: US 10,534,065 B2
(45) Date of Patent: Jan. 14, 2020

(54) ESTIMATION OF A LEVEL FOR AN OBSERVATION DATA SET

(71) Applicant: HERE GLOBAL B.V., Eindhoven (NL)

(72) Inventors: Jari Syrjärinne, Tampere (FI); Pavel Ivanov, Tampere (FI); Muhammad Irshan Khan, Tampere (FI)

(73) Assignee: HERE Global B.V., Eindhoven (NL)

( * ) Notice: Subject to any disclaimer, the term of this patent is extended or adjusted under 35 U.S.C. 154(b) by 226 days.

(21) Appl. No.: 15/321,300

(22) PCT Filed: Jun. 24, 2014

(86) PCT No.: PCT/EP2014/063219
§ 371 (c)(1),
(2) Date: Dec. 22, 2016

(87) PCT Pub. No.: WO2015/197107
PCT Pub. Date: Dec. 30, 2015

(65) Prior Publication Data
US 2017/0160375 A1    Jun. 8, 2017

(51) Int. Cl.
*H04B 17/00* (2015.01)
*G01S 5/02* (2010.01)

(52) U.S. Cl.
CPC .................. *G01S 5/0252* (2013.01)

(58) Field of Classification Search
CPC ....... H04W 4/02; H04W 64/00; H04W 48/04; H04W 60/04; H04W 40/20; G01S 5/0252; G01S 17/06; G01S 5/0263
See application file for complete search history.

(56) References Cited

U.S. PATENT DOCUMENTS

| | | |
|---|---|---|
| 8,385,943 B1 | 2/2013 | Han et al. |
| 2004/0061646 A1 | 4/2004 | Andrews et al. |
| 2005/0037775 A1* | 2/2005 | Moeglein .............. G01S 5/0036 |
| | | 455/456.1 |
| 2010/0109864 A1 | 5/2010 | Haartsen et al. |

(Continued)

OTHER PUBLICATIONS

International Search Report and Written Opinion for International Application No. PCT/EP2014/063219 dated Feb. 27, 2015.

(Continued)

*Primary Examiner* — Nhan T Le
(74) *Attorney, Agent, or Firm* — Alston & Bird LLP

(57) ABSTRACT

It is disclosed to obtain an observation data set comprising respective identification information of one or more observed radio nodes of an environment and respective radio measurements values determined with respect to the one or more observed radio nodes; to determine respective association measures for the observation data set with respect to respective radiomap data sets of two or more levels of the environment, wherein the radiomap data sets respectively comprise respective identification information of one or more radio nodes of the environment observable at the level of the respective radiomap data set and respective radio measurement value information for these one or more observable radio nodes; and to determine an estimate of a level associated with the observation data set based at least on the association measures.

19 Claims, 10 Drawing Sheets

(56) References Cited

U.S. PATENT DOCUMENTS

| | | |
|---|---|---|
| 2012/0046045 A1 | 2/2012 | Gupta et al. |
| 2012/0072106 A1 | 3/2012 | Han et al. |
| 2012/0195215 A1 | 8/2012 | Jeong |
| 2013/0035109 A1 | 2/2013 | Tsruya et al. |
| 2013/0195314 A1 | 8/2013 | Wirola et al. |
| 2013/0281111 A1* | 10/2013 | Syrjarinne ............ G01S 5/0252 455/456.1 |
| 2016/0161592 A1 | 6/2016 | Wirola et al. |

OTHER PUBLICATIONS

Xiaoyong, C. et al., *Reducing the Calibration Effort for Probabilistic Indoor Location Estimation*; IEEE Transactions on Mobile Computing, vol. 6, No. 1 (Jun. 1, 2007), 649-662.

Laoudias, C, et al., *Demo: The Airplace Indoor Positioning Platform*, MobiSys'12 (Jun. 2012) 1 page.

* cited by examiner

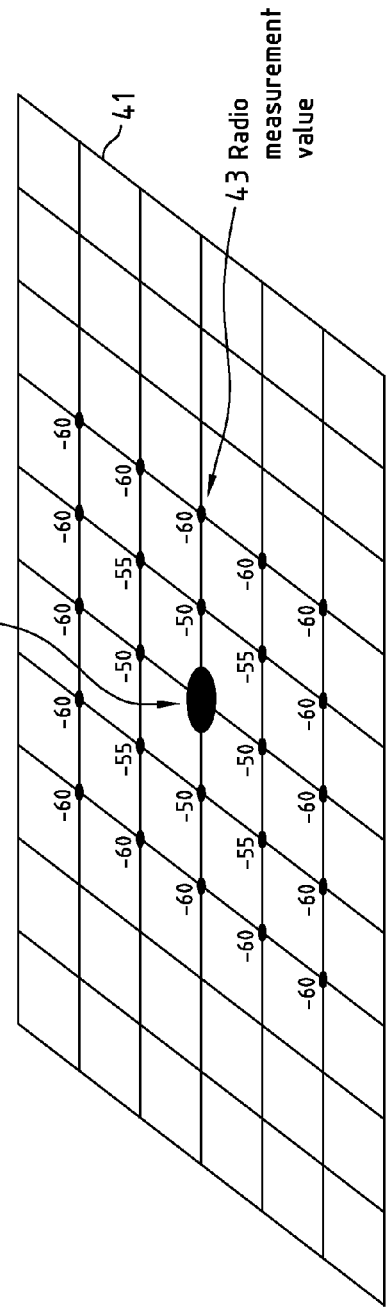

ESTIMATION OF A LEVEL FOR AN OBSERVATION DATA SET

FIELD OF THE DISCLOSURE

The invention relates to the fields of updating of radiomaps and using radiomaps for positioning.

BACKGROUND

Modern positioning technologies are based on generating large databases containing information on radio nodes, e.g. Wireless Local Area Network (WLAN) access points (APs), and their signals. The information may for instance originate at least partially from users of these positioning technologies acting as voluntary data collectors.

The observation data provided by the data collector terminals, for instance mobile terminals, is typically in the form of "fingerprints", which contain a position information, e.g. determined based on a map and/or obtained based on received satellite signals of a global navigation satellite system (GNSS) or another positioning system, radio node identification information identifying the one or more radio nodes that are observed by the data collector terminal, and radio measurement values, i.e. measurements of radio parameters pertaining to the observed radio nodes such as for instance a Received Signal Strength (RSS).

This observation data may then be transferred to a server or cloud, where the data (usually of a multitude of data collectors) may be collected and where radiomaps for positioning purposes may be generated and/or updated based on the collected data.

In the end, these radiomaps may be used for estimating a position, e.g. the position of a mobile terminal. This may function in two modes. The first mode is the terminal-assisted mode, in which the mobile terminal performs the radio measurements with respect to observed radio nodes to obtain radio measurement values via an air interface, and provides the identifiers of the observed radio nodes and the radio measurement values as observation data to a remote server, which in turn, based on the radiomaps, determines and provides the position estimate back to the mobile terminal. The second mode is the terminal-based mode, in which the mobile terminal has a local copy of the radiomaps (or only a subset thereof, as currently required by the mobile terminal), e.g. downloaded by the mobile terminal from a remote server or pre-installed in the mobile terminal, and performs the positioning itself (i.e. locally).

SUMMARY OF SOME EXAMPLE EMBODIMENTS OF THE INVENTION

Radiomap-based positioning may also be deployed in environments with several levels, such as for instance in buildings exhibiting several levels, e.g. floors. The radiomaps may then be level-specific (e.g. pertain to different levels, respectively). When generating and/or updating such level-specific radiomaps, observation data sets received from data collector terminals may then be assigned to different levels so that they can be used for generating and/or updating the radiomap of the level to which the observation data set pertains (e.g. the level on which the data collector terminal was located when producing the observation data set).

An example embodiment of a method according to the invention is disclosed, which comprises obtaining an observation data set comprising respective identification information of one or more observed radio nodes of an environment and respective radio measurements values determined with respect to the one or more observed radio nodes; determining respective association measures for the observation data set with respect to respective radiomap data sets of two or more levels of the environment, wherein the radiomap data sets respectively comprise respective identification information of one or more radio nodes of the environment observable at the level of the respective radiomap data set and respective radio measurement value information for these one or more observable radio nodes; and determining an estimate of a level associated with the observation data set based at least on the association measures.

This example embodiment of a method according to the invention may for instance be deployed in a process of updating one or more radiomap data sets based on an obtained observation data set, but equally well in a positioning process in which at least a level of an environment on which a terminal is located is to be estimated based on an observation data set produced by the terminal.

Moreover, an example embodiment of a computer program according to the invention is disclosed, the computer program when executed by a processor causing an apparatus to perform the presented example embodiment of the method according to the invention.

Furthermore, an example embodiment of a computer readable storage medium according to the invention is disclosed, in which the presented example embodiment of the computer program according to the invention is stored. The computer readable storage medium could be for example a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

Moreover, an example embodiment of an apparatus according to the invention is disclosed, which is configured to realize or comprises respective means for realizing the method according to the presented example embodiment of the method according to the invention.

The means of the apparatus can be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chip-set or a chip, like an integrated circuit. In general, the means may comprise for instance one or more processing means.

Furthermore, a further example embodiment of an apparatus according to the invention is disclosed, comprising at least one processor and at least one memory including computer program code, the at least one memory and the computer program code configured to, with the at least one processor, cause the apparatus at least to perform the presented example embodiment of the method according to the invention.

Any of the disclosed example embodiments of apparatuses may be a module or a component for a device, for example a chip. Alternatively, any of the mentioned apparatuses may be a device, for instance a server or a mobile device. Any of the disclosed example embodiments of apparatuses may comprise only the indicated components or may further comprise one or more additional components.

Moreover, an example embodiment of a system according to the invention is disclosed, comprising one or more apparatuses that are configured to realize or comprise respective means for realizing the presented example embodiment of the method according to the invention.

In example embodiments of the present invention, the determining of at least one of the association measures comprises determining, for at least one radio node of the one or more observed radio nodes, a difference measure between the radio measurement value determined with respect to the radio node and comprised in the observation data set and a radio measurement value obtained from the respective radio measurement value information for the radio node comprised in the radiomap data set, and determining the association measure based at least on respective difference measures of the radio nodes for which a respective difference measure has been determined.

In example embodiments of the present invention, the determining of the at least one of the association measures further comprises using, for at least one further radio node of the one or more observed radio nodes, for which further radio node the radiomap data set, with respect to which the association measure is determined, comprises no information or is considered not to comprise enough information, a pre-defined penalty value instead of a difference measure, and wherein the association measure is determined based at least on the respective difference measures of the radio nodes for which a difference measure has been determined and the penalty value.

In example embodiments of the present invention, the association measure is determined further based on one or more weight factors respectively applied to one or more of the difference measures of the radio nodes for which a respective difference measure has been determined, wherein at least one of the one or more weight factors depends on a characteristic of the radio node for which the difference measure to which the weight is applied has been determined. The characteristic of the radio node may for instance be a type of a radio standard according to which the radio node operates and/or a radio coverage range of the radio node and/or a transmission frequency used by the radio node and/or a transmission power used by the radio node.

In example embodiments of the present invention, the estimate of the level associated with the observation data set is used in an updating process for at least one of the respective radiomap data sets of the two or more levels of the environment.

In example embodiments of the present invention, an observation position that has been associated with the observation data set is a candidate observation position, respective association measures for the observation data set are determined with respect to respective radiomap data sets of two or more levels of the environment and with respect to a respective plurality of candidate observation positions that are either the same on each level or at least partially different on at least two levels, and the estimate of the level associated with the observation data set and an estimate of an observation position on this level is determined based at least on the association measures.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 3 is a schematic illustration of an observation data set;

FIG. 4 is a schematic illustration of a grid-based radio-model for a radio node;

DETAILED DESCRIPTION OF EXAMPLE EMBODIMENTS OF THE INVENTION

Figure 1:
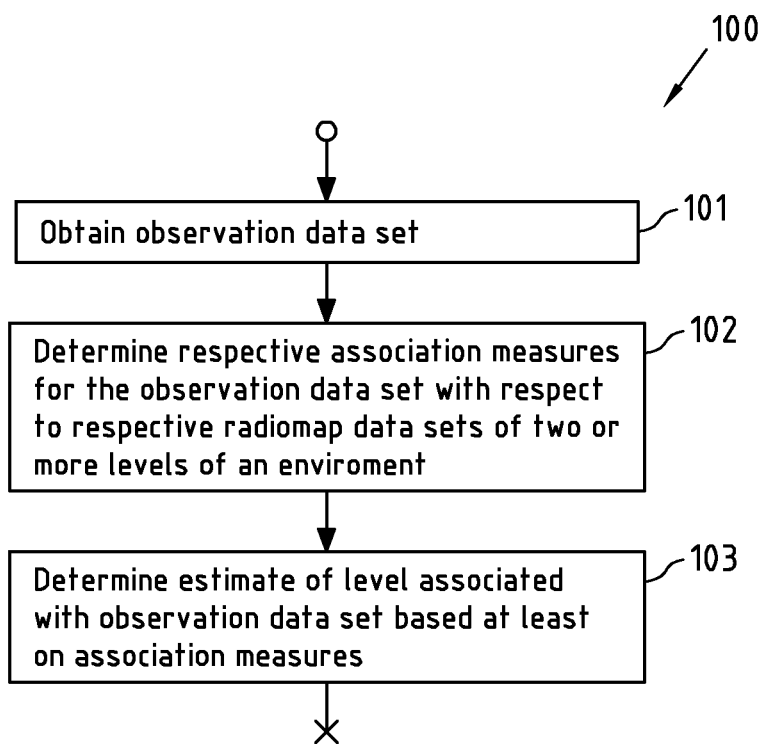
FIG. 1 is a flowchart of an example embodiment of a method according to the invention.

Indoor positioning requires novel systems and solutions that may be specifically developed and deployed for this purpose. The desired positioning accuracy (e.g. 2-3 m), coverage (e.g. around 100%) and floor detection are challenging to achieve with satisfactory performance levels.

Several indoor-dedicated solutions have already been developed and commercially deployed during the past years, e.g. solutions based on pseudolites (Global Positioning System (GPS)-like short-range beacons) or ultra-sound positioning. What is typical to these solutions is that they require either deployment of totally new infrastructure (beacons, tags and so on) or manual exhaustive radio-surveying of the buildings including all the floors, spaces and rooms. This is rather expensive and will take a considerable amount of time to build the coverage to the commercially expected level, which in some cases narrows the potential market segment only to very thin customer base e.g. for health care or dedicated enterprise solutions. Also, the diversity of these technologies makes it difficult to build a globally scalable indoor positioning solution, and the integration and testing will become complex if a large number of technologies is needed to be supported in the consumer devices, such as smartphones.

For an indoor positioning solution to be commercially successful, that is, in particular, being globally scalable, having low maintenance and deployment costs and offering acceptable end-user experience, the solution is preferably based on an existing infrastructure in the buildings and on existing capabilities in the consumer devices. This leads to a consideration that indoor positioning may be based on Wireless Local Area Network (WLAN) based technologies (e.g. Wi-Fi technologies) and/or Bluetooth (BT)-technologies that are already supported in every smartphone, tablet, laptop and even in the majority of feature phones. It is desirable to find a solution that uses the WLAN- and BT-radiosignals in such a way that high horizontal positioning accuracies, e.g. in the range of 2-3 m, with close to e.g. 100% floor detection are achieved with the ability to quickly build the global coverage for this approach.

A novel approach for radio-based indoor positioning models e.g. the WLAN-radio environment (or any similar radio, e.g. Bluetooth) from observed Received Signal Strength (RSS)-measurements as 2-dimensional radiomaps and is hereby able to capture the dynamics of the indoor radio propagation environment in a highly accurate way. This makes it possible to achieve unprecedented horizontal positioning accuracy with the WLAN-signals only within the coverage of the created radiomaps, and also gives highly reliable floor detection. However, as long as the radiomaps need to be captured manually, rapid global scalability is blocked.

Larger volumes of indoor WLAN measurement data could be harvested via crowd-sourcing if the consumer devices were equipped with the necessary functionality to enable the WLAN-data collection as a background process, naturally with the end-user consent. It could also be possible to use volunteers to survey the sites (e.g. buildings) in exchange of reward or recognition and get the coverage climbing up globally in the places and venues important for the key customers. However, the technical challenges related to the harvesting, processing, redundancy, ambiguity and storing the crowd-sourced data need to be understood and solved first, before the WLAN-radiomap creation can be based on the machine learning of the indoor WLAN-radiomaps.

The creation of 2D-radiomaps e.g. for WLAN, may require that the floor-specific RSS-measurement data collected at one floor is strictly mapped to the same floor, but not to different ones. If the RSS-measurements from two or more different floors are mixed, the model of the radio propagation environment may become ambiguous and inaccurate, which leads to poor positioning performance in term of accuracy.

The risk of mixing the floors is rather high in cases where the data is not collected by experienced surveyors. If the data is crowd-sourced or collected by volunteers, the reference floor information in the measurement data can easily be off by one or more floors or totally missing, which could lead to disastrous end-results unless handled carefully. The reference floor information is typically entered manually (based on map data) or measured e.g. by a barometer (based on air pressure changes) which have a considerable risk for human or machine errors.

FIG. 1 is a flowchart 100 illustrating a method that constitutes an example embodiment of a method according to the invention. The method may for instance be performed by an apparatus. The method may for instance be a method for determining a level associated with an observation data set. The method comprises obtaining an observation data set (step 101); determining respective association measures for the observation data set with respect to respective radiomap data sets of two or more levels of an environment (step 102); and determining an estimate of a level associated with the observation data set based at least on the association measures (step 103).

Figure 2A:
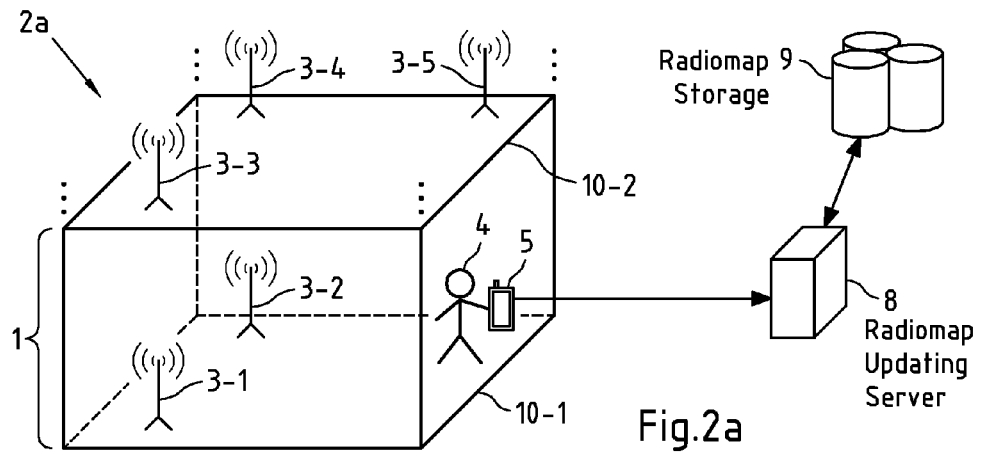
FIGS. 2a-2c are schematic illustrations of example embodiments of systems according to the invention.
Figure 2B:
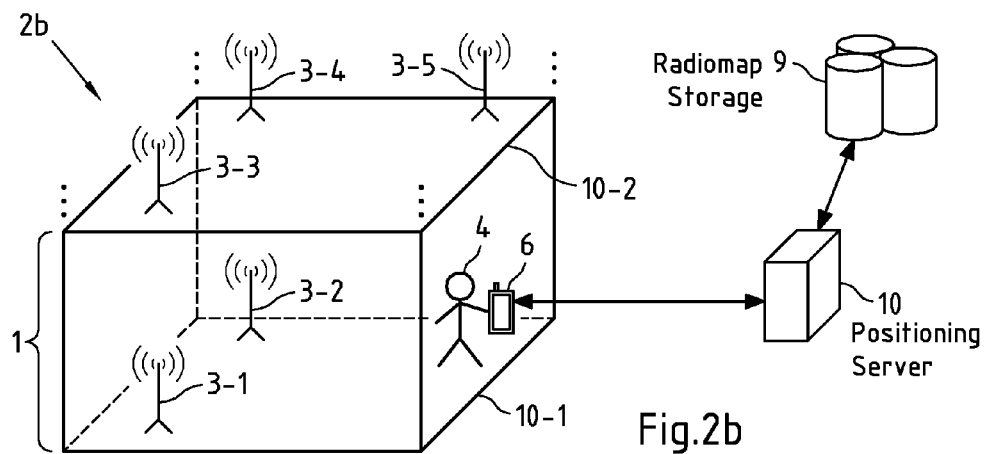
Figure 2C:
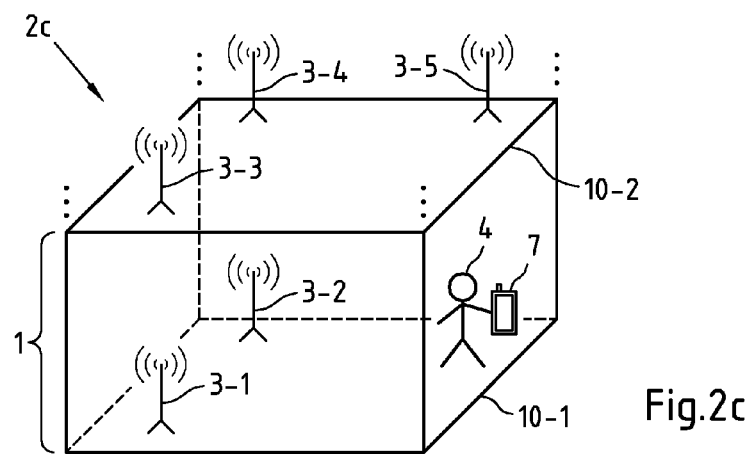

Examples of systems in which the method of FIG. 1 may be deployed are illustrated in FIGS. 2a-2c. These systems 2a-2c form example embodiments of systems according to the present invention, that comprise one or more apparatuses that are configured to realize (e.g. perform) or comprise respective means for realizing (e.g. performing) the method of FIG. 1.

In FIG. 2a, an environment 1 is shown, which exhibits a plurality of levels, of which two levels 10-1 and 10-2 are exemplarily shown. Environment 1 may for instance comprise one or more buildings (e.g. a residential building, a department store, a mall, a museum, an industrial construction, a sports arena, etc.), and may for instance comprise also at least a part of the surroundings of the one or more buildings, such as forecourts, gardens, parking spaces, etc. An environment may also be understood as a venue or site. A level is understood here as a substantially flat two-dimensional plane, with different levels being at different heights. In a building, levels may for instance be mapped to floors of the building, e.g. a basement, a ground floor, a first floor above the ground floor, etc.

In environment 1, a plurality of radio nodes are installed, of which radio nodes 3-1 to 3-5 are exemplarily depicted. Radio nodes 3-1 and 3-2 are positioned on level 10-1, and radio nodes 3-3, 3-4 and 3-5 are positioned on level 10-2. Radio nodes may for instance be radio communication nodes. A terminal 5 of user 4 may transmit and/or receive data to/from a radio node via a wireless radio link. The radio node may be the source and/or the sink of the data transmission, or may function as a bridge, gateway or router towards another communication unit or network. Non-limiting examples of radio nodes are radio nodes that are capable of operating according to a Wireless Local Area Network (WLAN) standard, for instance a standard of the 802.11 family of standards of the Institute of Electrical and Electronics Engineers (IEEE), which inter alia comprises the standards 802.11, 802.11a, 802.11b, 802.11e, 802.11g and 802.11n, to name but a few examples. Further examples of radio nodes are radio nodes that are capable of operating according to the HIPERLAN/1, HIPERLAN/2, HomeRF or Bluetooth standard (e.g. the Bluetooth 4.0 standard available at www.bluetooth.com or a successor thereof).

The radio nodes 3-1 to 3-5 may have actually been installed in environment 1 for communication purposes, e.g. for allowing terminal 5 to connect to the Internet or other networks (e.g. with radio nodes serving as WLAN access points that are connected to the Internet), but are additionally exploited for determining positions of terminals, as will be discussed with respect to FIGS. 2b and 2c below. It is however not excluded that at least one of the radio nodes has been installed in environment 1 to improve positioning of terminals in environment 1.

As a prerequisite for positioning of terminal 5 (i.e. determining or estimating a position of terminal 5), radiomaps have to be available for environment 1. Radiomaps are represented by radiomap data sets that respectively comprise respective identification information of one or more radio nodes of the environment 1 observable (e.g. at at least one position) on the level of the respective radiomap data set and respective radio measurement value information for these one or more observable radio nodes. Radiomap data sets thus may be level-specific (e.g. specific for a level or pertaining to a level), there may thus be one or more radiomap data sets for a first level of an environment, and one or more radiomap data sets for a second level of the environment. A radiomap data set may for instance comprise information of one or more radiomodel data sets. A radiomodel data set is representative of a radiomodel and may for instance comprise radio measurement value information for a radio node. Radio measurement value information may for instance comprise radio measurement values, and/or may for instance comprise information useable to determine one or more radio measurement values.

FIG. 4 is a schematic illustration of a grid-based radiomodel 40 for a radio node. The location of the radio node on grid 41, which here is exemplarily shown as an equally spaced two-dimensional grid, is denoted by reference numeral 42. A plurality of grids points around this position 42 are associated with radio measurement values pertaining to the radio node. The radio measurement values may for instance contain a Received Signal Strength (RSS), e.g. measured in dBm, for instance with a reference value of 1 mW, with or without the Doppler effect being averaged out therein, and/or pathlosses and/or timing measurement values like timing advance (TA), round-trip time (RTT) and/or propagation delay, and/or an angle of arrival (AOA). Boolean radio measurement values are also possible, e.g. a radio measurement value that indicates whether or not a specific location lies within the coverage area of a specific communication network node. In FIG. 4, it is exemplarily assumed that the radio measurement values are RSS values given in dBm. In a radiomodel, a radio measurement value assigned to a grid position shall indicate which radio measurement value is expected to be measured by a terminal at this (or close to this) position. The radio measurement value at a grid position in the radiomodel may be based on a single measurement performed by a terminal at this (or close to this) grid position, or by a plurality of (e.g. averaged or otherwise combined) measurements performed by one or more terminals at this (or close to this position). If a terminal is not exactly at a grid position when performing the measurement, the measurement may for instance be assigned to the closest grid point.

A radiomodel thus may for instance describe how a signal transmitted e.g. by a single radio node actually behaves (e.g. attenuates) in the vicinity of the radio node. The present example embodiment is based on an equally-spaced grid where each grid point contains an RSS value that is based on real observation (measurements) made by a device. The RSS values generally decrease as the distance to the physical location of the radio node increases creating a model of the radio propagation environment relevant for the radio node in question. The RSS values in the grid points are for instance based on real observations and are for instance created via machine learning.

It should however be noted that a radiomodel does not necessarily have to be based on an equally spaced grid, also grids that have a different spacing in one grid direction as compared to the other grid dimension are possible, and the grid spacing may even vary within one or both grid dimensions. Furthermore, the radiomodel may not be based on a grid at all. For instance, the radiomodel may for instance comprise parameters that are characteristic of a formula allowing calculating the radio measurement value to be expected at a position of interest, e.g. parameters of a pathloss model or the like.

A complete radiomodel for a radio node may (in contrast to the example of FIG. 4) contain more than one grid, as the signal from the radio node may be present on multiple levels (e.g. floors). The radio signal may be relatively strong so it may easily penetrate more than one floor and hence a multi-floor radiomodel is needed.

A radiomap for a given level may for instance be a collection of radiomodels of the radio nodes that are present (observable or "audible") on that level. Each level may have a finite number of radio nodes that have been observed on that level and the radiomap for the level will represent the total radio environment consisting of multiple radio nodes for instance as accurately as possible. The radiomap used for positioning (e.g. in a server or a terminal) does not necessarily consist of the original radio-node- and level-specific grids, but may for instance be a compressed version thereof, wherein the compression may for instance be achieved by Fourier transformation and run-length encoding of the transform coefficients.

A radiomap data set thus comprises (e.g. level-specific) information of one or more radiomodel data sets (which are respectively representative of radiomodels). Also respective identification information of the radio node to which the respective radiomodel data set pertains is included in the radiomap data set. A radiomap data set may thus for instance comprise information from one or more radiomodel data sets of respective radio nodes that are observable (e.g. at least at one position) on the level of the environment to which level the radiomap data set pertains, each radiomodel data set associated with an identification information of the respective radio node. If the radiomodels are based on grids, and if the girds have the same grid dimensions and grid spacings, the radiomap data set may for instance be represented (and for instance stored) as a single grid. A grid point of this single grid could then for instance be associated with identification information for all radio nodes that are observable at this grid point, together with the respective radio measurement values for these observable respective radio nodes.

The identification information of a radio node may for instance be an identifier of the radio node, e.g. a globally unique or at least locally unique identifier of the radio node. A non-limiting example of identification information of a radio node is a Medium Access Control (MAC) address of a radio node. This MAC address may for instance be contained in signals transmitted by the radio node and may thus be recognizable by a terminal.

In the example scenario of FIG. 2a, a radiomap data set for level 10-1 may thus for instance be expected to comprise at least radiomodel data sets for radio nodes 3-1 and 3-2, and, depending on the amount of attenuation of radio signals caused by the ceiling below level 10-2, also radiomodel data sets for one or more of radio nodes 3-3, 3-4 and 3-5.

A radiomap data set may for instance be generated by having one or more terminals, for instance a dedicated collector terminal of a professional surveyor or a normal terminal of an end user that voluntarily performs measurements, perform measurements at different positions on a level (e.g. level 10-1 of environment 1). Each measurement would comprise identifying the radio nodes that can be observed at the respective observation position (for instance at substantially the same time, e.g. within a limited time interval of less than e.g. 5 s, 1 s, 100 ms or 10 ms duration) and determining respective radio measurement values (e.g. RSS values) with respect to the observable radio nodes. The results could for instance be put into an observation data set, that comprises respective identification information of one or more observed radio nodes of the environment and respective radio measurement values determined with respect to the one or more observed radio nodes. As already stated, the observation of the radio nodes and/or the determining (e.g. capturing) of the radio measurement values may for instance be performed within a limited time interval, for instance to ensure that the terminal does not change its position significantly during this time interval. Otherwise, the observed radio nodes and the associated radio measurement values could no longer be considered to pertain to a single observation position, and the quality of the radiomap data set would be deteriorated.

A radio node may for instance be observable by a terminal if the terminal is within a radio coverage area of the radio node. A radio node may for instance be observable by a terminal if the terminal is able to receive a signal (e.g. a broadcast signal) from the radio node with at least a pre-defined signal-to-noise ratio or with at least a pre-defined signal-to-noise-and-interference ratio, or is able to at least receive and correctly recover an identification information contained in a signal transmitted by the radio node (e.g. a broadcast signal).

An example of an observation data set 30 is given in FIG. 3. As already stated above, the observation data set 30 comprises identification information 35-1 . . . 35-N of the N radio nodes that could be observed at the observation position at the time the observation data set was produced, here exemplarily represented by MAC addresses, and the respective radio measurement values 36-1 . . . 36-Nm here exemplarily represented by RSS values in dBm. Furthermore, the observation data set comprises information on the observation position 33 (here exemplarily given in geo coordinates with a latitude and a longitude), which may for instance be determined by a Global Navigation Satellite System (GNSS) receiver of the terminal that produces the observation data set and/or based on a map of the environment, the observation time 34, which may for instance be determined from a clock of the terminal (e.g. as a Universal Time Coordinated (UTC) timestamp), and also with information on the building 31 and the floor 32 within the building where the observation data set was produced. The information on the building 31 and/or the floor 32 may for instance be entered into the terminal manually by the user of the terminal. The information on the floor 32 may for instance be determined by a unit of the terminal, e.g. a barometer.

In the system 2a of FIG. 2a, terminal 5 would produce and send such observation data sets to radiomap updating server 8. Transmission of the observation data sets to radiomap updating server 8 may take place at least partially via a wireless transmission link. The transmission could for instance be based on a cellular radio network, which is connected to the Internet to which in turn the radiomap updating server 8 is connected. Equally well, the radiomap updating server might be connected to the core network of the cellular radio network. As a further alternative, the transmission could take place via one of the observed radio nodes 3-1 . . . 3-5, which provides Internet connectivity to terminal 5 and enables terminal 5 to send the observation data set to radiomap updating server 8, which is also connected to the Internet.

In system 2a of FIG. 2a, it is exemplarily assumed that radiomap data sets already exist for the environment 1 and are stored in radiomap storage 9 (which could equally well be a part of radiomap updating server 8), and that radiomap updating server 8 is configured to update the radiomap data sets stored in radiomap storage 9 (e.g. in regular or irregular intervals) based on received observation data sets to ensure that the radiomap data sets remain up-to-date in view of changes in the propagation conditions in environment 1 or relocation of radio nodes in environment 1, to name but a few examples that might affect the actuality of the radiomap data sets. Equally well, the received observation data sets could be used to set up a not yet existing radiomap data set. The updating may for instance comprise adding information pertaining to at least one of the observed radio nodes to the radiomap data set. For instance, if a radiomodel data set for this radio node does not yet contain a radio measurement value for the observation position (e.g. for a grid point at or close to the observation position), the radio measurement value from the observation data set may be assigned to this radiomodel data set (e.g. to this grid position). If the radiomodel data set for this radio node does already contain a radio measurement value for the observation position (e.g. for a grid point at or close to the observation position), an average may be formed of this radio measurement value and the radio measurement value from the observation data set. If no radiomodel data set does yet exist for at least one of the observed radio nodes in the radiomap data set, a new radiomodel data set for this radio node may be generated and added to the radiomap data set.

The method of FIG. 1 may for instance be deployed in the process of updating radiomap data sets. The method of FIG. 1 may then for instance be performed by the radiomap updating server 8 of FIG. 2a. In particular, the estimate of the level associated with the observation data set may be compared with information on a level comprised in the observation data set (see e.g. floor ID 32 of FIG. 3), and the observation data set may be used for updating a radiomap data set under consideration of a result of this comparison. As will be further described below, such an updating may for instance only be performed if the estimate of the level matches the information on the level comprised in the observation data set. The effect of having an estimate of the level associated with the observation data set is then for instance to be able to verify the accuracy of an information of the level contained in the observation data set, which may have a certain affinity to being faulty. Alternatively, in cases where the observation data set does not comprise information on the level to which the observation data set shall pertain, the estimate of the level may substitute such missing information on the level and nevertheless allow the observation data set to be used in an updating process.

Additionally or alternatively, the method of FIG. 1 may for instance be deployed in a process of determining a three-dimensional position estimate of a terminal, as illustrated in FIGS. 2b and 2c. In particular, the estimate of the level may represent one dimension of the three-dimensional position estimate, whereas the remaining two dimensions are represented by a two-dimensional position estimate for the terminal on this estimated level. The estimate of the level and the estimate of the two-dimensional position may be determined jointly, or may be determined sequentially.

In the system 2b of FIG. 2b, it is assumed that up-to-date radiomap data sets for environment 1 exist in radiomap storage 9 (which may equally well be a part of positioning server 10). Terminal 6 of user 4 may then for instance produce an observation data set that contains identification information of the radio node(s) observable at the current position and current time and the associated radio measurement values, and may transmit this observation data set to positioning server 10. The observation data set, in contrast to the system 2a of FIG. 2a, may not comprise an observation position, for instance because terminal 6 does not comprise a GNSS receiver, and may also not comprise an information on the level. The transmission of the observation data set from terminal 6 to positioning server 10 may for instance take place as described for the link between terminal 5 and radiomap updating server 8 in FIG. 2a before. Based on the observation data set and the radiomap data sets comprised in radiomap storage 9, to which positioning server 10 is connected or connectable, positioning server 10 is able to estimate the level on which terminal 6 is located and/or the two-dimensional position of terminal 6 (e.g. in the horizontal plane), and then returns this information to terminal 6. Therein, for the estimation of the level, the method of FIG. 1 may for instance be deployed in positioning server 10. It should be noted that radiomap updating server 8 and positioning server 10 may be different servers, but may equally well be the same server.

In the system 2c of FIG. 2c, it is assumed that radiomap data sets for environment 1 exist in terminal 7. Such radiomap data sets may for instance have been generated and/or updated by radiomap updating server 8 of the system 2a of FIG. 2a, and may have been downloaded to terminal 7, for instance upon entrance of the user 4 of terminal 7 into the environment 1, for instance automatically or manually upon user request. Terminal 7 may not comprise a GNSS receiver, and may thus use radiomap-based positioning to determine its three-dimensional position in environment 1. To this end, an observation data set is produced by terminal 7, and at least based on the identification information on the observed radio nodes, the associated radio measurement values and the stored radiomap data sets, terminal 7 is able to estimate the level on which terminal 7 is located and/or the two-dimensional position of terminal 7 (e.g. in the horizontal plane). Therein, for the estimation of the level, the method of FIG. 1 may for instance be deployed in terminal 7.

Returning to the method of FIG. 1, in step 101, the observation data set is obtained. The observation data set may for instance be obtained, e.g. received, from another apparatus that is either external or internal to an apparatus that performs the method of FIG. 1. For instance, the observation data set may be obtained by a processor from a transceiver or network interface, or may be received by radiomap updating server 8 (see FIG. 2a) or positioning server 10 (see FIG. 2b) from terminal 5 or terminal 6, respectively. The observation data set may for instance be generated by a terminal (e.g. terminals 5, 6 or 7 of FIGS. 2a-2c). The radio nodes may thus for instance be observed by the terminal, for instance at an observation position and/or at an observation time (or within an observation time interval of limited length). The radio measurement values may for instance be determined by the terminal.

The terminal may for instance be a mobile terminal, but may equally well be a stationary terminal. Non-limiting examples of a terminal are a mobile phone, a personal digital assistant (PDA), a computer, e.g. a laptop, a notebook or tablet computer, a digital music player, a gaming device, a navigation device etc. The terminal may for instance comprise a user interface, an antenna and/or a radio interface configured to at least receive information from the radio nodes.

In step 102, respective association measures are determined for the observation data set with respect to radiomap data sets of two or more levels of the environment. For instance, a first association measure may be determined for the observation data set with respect to a radiomap data set of a first level of the environment, and a second association measure may be determined for the observation data set with respect to a radiomap data set of a second level of the environment. The association measure thus may be considered to be level-specific. The association measure may for instance express a degree of association of the information contained in the observation data set to information contained in the radiomap data set. For instance, if the radiomap data set indicates that, for a position at (or close to) an observation position associated with the observation data set (e.g. a position where the observation data set was produced and that is contained in the observation data set), the same radio cells as identified in the observation data set are observable with similar radio measurement values as contained in the observation data set, a high association measure should be expected. The association measure may for instance be based on a correlation function. Further details on the calculation of the association measure will be provided below. The radiomap data sets may also be obtained as a part of the method of FIG. 1, for instance from a memory or storage that is internal to the apparatus that performs the method of FIG. 1, or from an external memory or storage.

In step 103, the estimate of the level associated with the observation data set is determined based at least (or for instance only) on the association measures. For instance, the estimate of the level associated with the observation data set is determined as the level of the (level-specific) radiomap data set for which the association measure among the determined association measures that indicates the highest association was determined.

Figure 5:
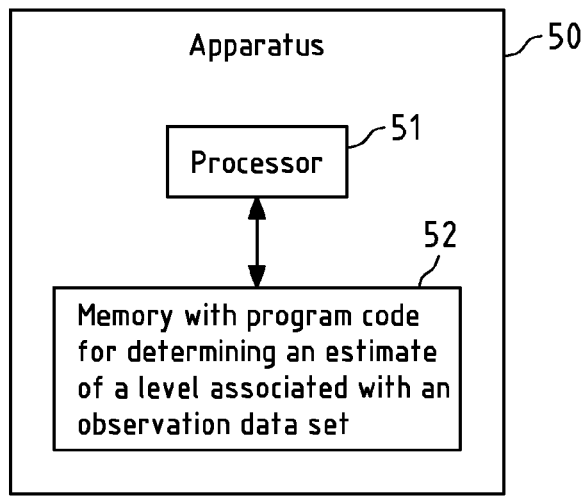
FIGS. 5-9 are block diagrams of example embodiments of apparatuses according to the invention.

FIG. 5 is a block diagram of an apparatus 50 that represents an example embodiment of an apparatus according to the present invention. Apparatus 50 comprises at least one processor 51 and at least one memory 52 including computer program code, the at least one memory 52 and the computer program code configured to, with the at least one processor 51, cause an apparatus (for instance apparatus 50, or another apparatus) at least to perform the method of FIG. 1 (and for instance also one or more of its further features that will be discussed below). Processor 51 for instance executes the program code stored in memory 52. Processor 51 for instance accesses memory 52 via a bus.

Apparatus 50 is also an example of an apparatus that is configured to realize or comprises respective means for realizing the method of FIG. 1 (and for instance also one or more of its further features that will be discussed below). The processor 51 of apparatus 50 may for instance represent means for realizing the method of FIG. 1. Apparatus 50 may thus for instance comprise means for obtaining the observation data set, means for determining respective association measures for the observation data set with respect to respective radiomap data sets of two or more levels of an environment, and means for determining an estimate of a level associated with the observation data set based at least one the association measures. These means may be represented by different functional modules or different circuitry of processor 51, or may at least partially or entirely be represented by the same functional modules or the same circuitry.

Apparatus 50 of FIG. 5 may for instance represent one of radiomap updating server 8, positioning server 10 or terminal 7 (see FIGS. 2a-2c), or form a part thereof.

Figure 6:
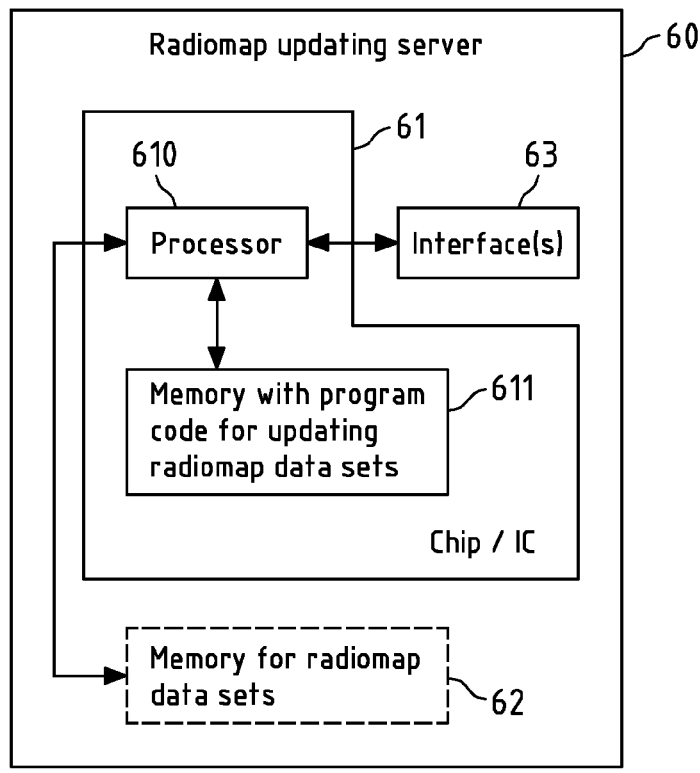

FIG. 6 is a block diagram of an example of a radiomap updating server 60, for instance radiomap updating server 8 of FIG. 2a. Radiomap updating server 60 also constitutes an example embodiment of an apparatus according to the invention. In particular, radiomap updating server 60 comprises the processor 51 and memory 52 of apparatus 50 of FIG. 5 in the form of processor 610 and memory 611. The above description of these components thus also applies here. Processor 610 and memory 611 are embodied as a chip or Integrated Circuit (IC) 61. Processor 610 controls one or more interfaces 63. These interfaces 63 may for instance comprise a network interface, e.g. to the Internet or to another network (e.g. a cellular radio network), for instance a network via which radiomap updating server 60 obtains observation data sets from one or more terminals. Interfaces 63 may further comprise an interface to radiomap storage 9, if radiomap storage 9 does not form a part of radiomap updating server 60. If radiomap storage 9 forms part of radiomap updating server 60, as shown by block 62 in dashed lines, processor 610 has access to the radiomap data sets stored in this memory 60.

Figure 7:
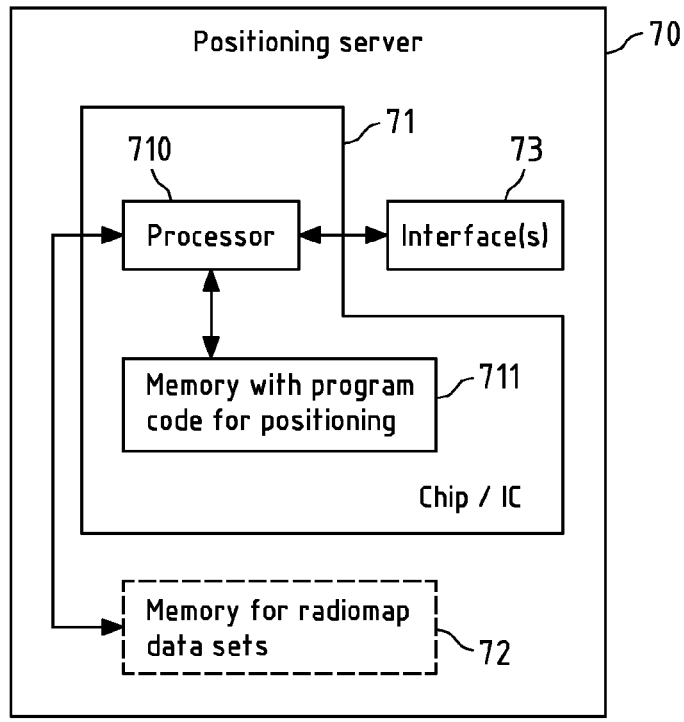

FIG. 7 is a block diagram of an example of a positioning server 70, for instance positioning server 10 of FIG. 2b. Positioning server 70 also constitutes an example embodiment of an apparatus according to the invention. In particular, positioning server 70 comprises the processor 51 and memory 52 of apparatus 50 of FIG. 5 in the form of processor 710 and memory 711. The above description of these components thus also applies here. Processor 710 and memory 711 are embodied as a chip or Integrated Circuit (IC) 71. Processor 710 controls one or more interfaces 73. These interfaces 73 may for instance comprise a network interface, e.g. to the Internet or to another network (e.g. a cellular radio network), for instance a network via which positioning server 70 obtains observation data sets from one or more terminals. Interfaces 73 may further comprise an interface to radiomap storage 9, if radiomap storage 9 does not form a part of positioning server 70. If radiomap storage 9 forms part of positioning server 70, as shown by block 72 in dashed lines, processor 710 has access to the radiomap data sets stored in this memory 72.

Figure 8:
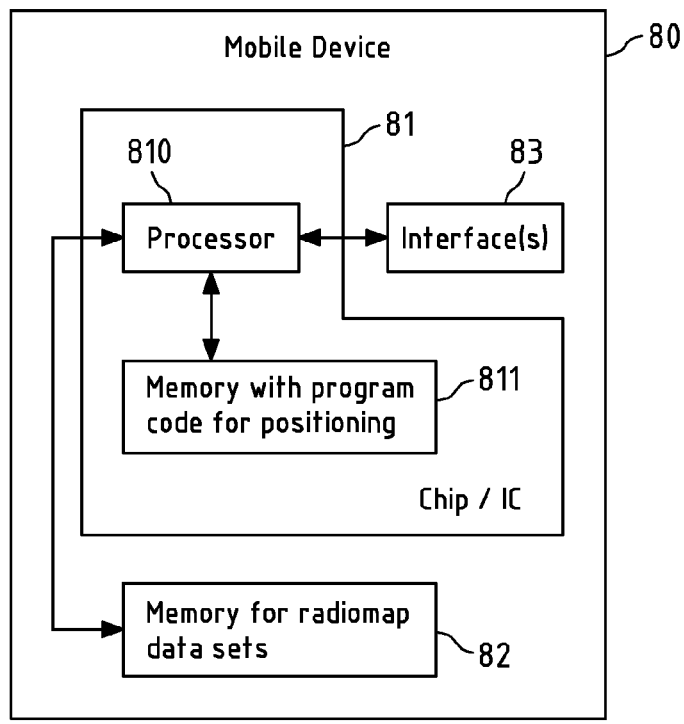

FIG. 8 is a block diagram of an example of a terminal 80, for instance terminal 7 of FIG. 2c. Terminal 80 also constitutes an example embodiment of an apparatus according to the invention. In particular, terminal 80 comprises the processor 51 and memory 52 of apparatus 50 of FIG. 5 in the form of processor 810 and memory 811. The above description of these components thus also applies here. Processor 810 and memory 811 are embodied as a chip or Integrated Circuit (IC) 81. Processor 810 controls one or more interfaces 83. These interfaces 83 may for instance comprise a radio interface, for instance to allow communication (e.g. data transmission) with or at least identify radio nodes of environment 1. Terminal 80 further comprises a memory 82 for radiomap data sets, enabling terminal 80 to determine position estimates based on observation data sets produced by terminal 80 and radiomap data sets contained in memory 82.

Figure 9:
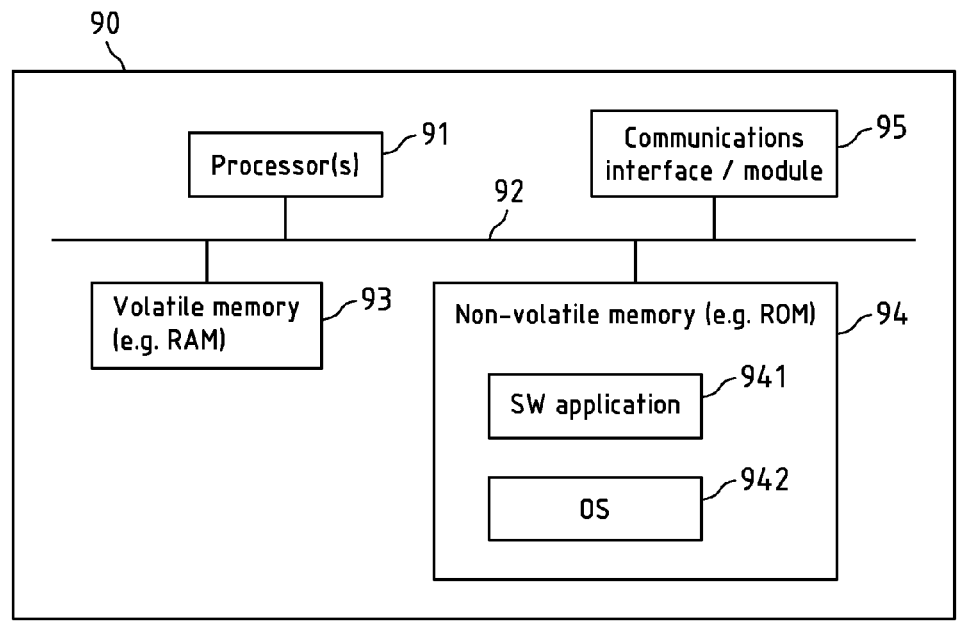

FIG. 9 is a block diagram of a further example of an apparatus 90 according to the invention. Apparatus 90 may for instance represent one of radiomap updating server 8, positioning server 10 or terminal 7 (see FIGS. 2a-2c), or form a part thereof. Apparatus 90 comprises one or more processors 91, corresponding to processor 51 of apparatus of FIG. 5 above, and a non-volatile memory (e.g. a Read-Only Memory (ROM)) 94, which comprises a software application 941 and an operating system 942 that controls the operation of at least one of processors 91. Software application 94 may for instance comprise program code that when executed by processor(s) 91 cause an apparatus (e.g. apparatus 90) to perform the method of FIG. 1 (and for instance also one or more of its further features that will be discussed below). Memory 94 and the program code of software application 941 may be configured to, with the at least one processor 91, cause an apparatus (e.g. apparatus 90) at least to perform the method of FIG. 1 (and for instance also one or more of its further features that will be discussed below). Apparatus 90 further comprises a volatile memory (e.g. a Random Access Memory (RAM)) 93, for instance serving as a working memory for processor(s) 91, and a communications interface or module 95, allowing apparatus 90 to transmit and/or receive information. Components 91, 93, 94 and 95 are connected via a bus 92. Further components may be connected to this bus, such as for instance a user interface, a storage for radiomap data sets (if provided internally in apparatus 90), etc.

The processors of FIGS. 5-9 should also be understood to represent processing circuitry in general.

The computer programs stored in memories 52, 611, 711, 811 and 94 (in particular software application 941) constitute example embodiments of a computer program according to the invention.

Figure 10:
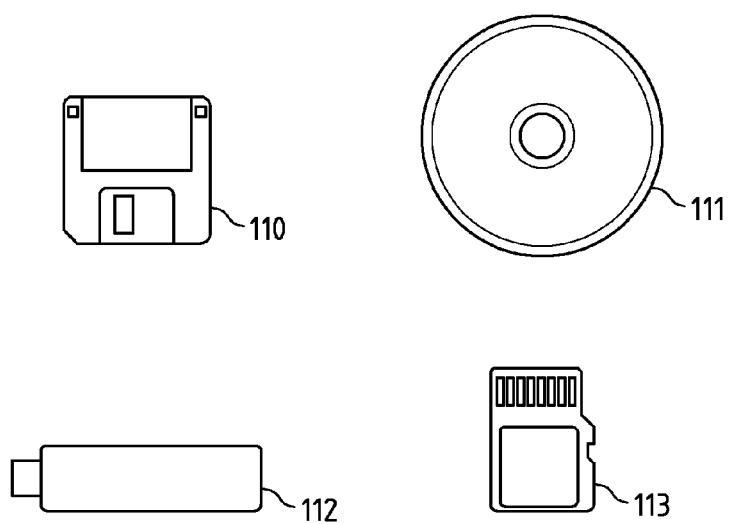
FIG. 10 is a schematic illustration of example embodiments of tangible computer-readable storage media according to the present invention.

FIG. 10 illustrates example embodiments of computer-readable storage media 110-113 according to the present invention. The computer readable storage media store a computer program that, when executed by a processor, cause an apparatus to perform the method of FIG. 1 (and for instance also one or more of its further features that will be discussed below). The computer readable storage media are exemplarily removable and/or portable. As examples are depicted, a magnetic disc 110, an optical disc 111 (e.g. a Digital Versatile Disc (DVD)), a semiconductor memory stick 112 (e.g. a Universal Serial Bus (USB) stick) and a semiconductor memory card 113 (e.g. an SD-Card).

In the following, further example features of the example method of the invention (see FIG. 1) will be described, which shall also be considered to be disclosed as example features of the example embodiments of apparatuses, systems, computer programs and computer readable storage media of the invention.

In example embodiments of the invention, the determining of at least one of the association measures (see step 102 of FIG. 1) comprises determining, for at least one radio node of the one or more observed radio nodes, a difference measure between the radio measurement value determined with respect to the radio node and comprised in the observation data set and a radio measurement value obtained from the respective radio measurement value information for the radio node comprised in the radiomap data set, and determining the association measure based at least on respective difference measures of the radio nodes for which a respective difference measure has been determined.

This determining of an association measure is presented in flowchart 1100 of FIG. 1. To determine association measures for the observation data set with respect to further radiomap data sets, the processing of flowchart 1100 would be performed again with respect to each further radiomap data set, accordingly. In step 1101 of flowchart 1101, the respective difference measures for one or more observed radio nodes are determined, and in step 1103, the association measure is determined at least based on the determined difference measures. Step 1102 is an optional step that will be discussed later. Furthermore, the processing of flowchart 1100 can be extended by considering one or more penalty values, e.g. for situations where difference measures cannot be computed, as will be discussed with respect to flowchart 1300 of FIG. 13 below.

The difference measures represent a degree of difference between radio measurement values contained in the observation data set and radio measurement values contained in the radiomap data set, wherein both radio measurement values pertain to the same radio node. The difference measure may for instance be an absolute value of the difference between the radio measurement values (or a function), or a squared difference between the radio measurement values or a function thereof, to name but a few examples.

The one or more radio nodes for which difference measures are determined in step 1101 may for instance be observed radio nodes (i.e. radio nodes for which the observation data set comprises identification information) for which the radiomap data set comprises information or is considered to comprise enough information, as will be discussed further below. The determining of the difference measure and/or the decision whether a difference measure shall be determined for a radio node may for instance depend on an observation position that is contained in the observation data set or has been associated with the observation data set. For instance, a difference measure may only be determined for a radio node if the radiomap data set comprises radio measurement information for this radio node for a position that is equal to or at least close to the observation position. Otherwise, a penalty value may be used instead of the difference measure.

Figure 11:
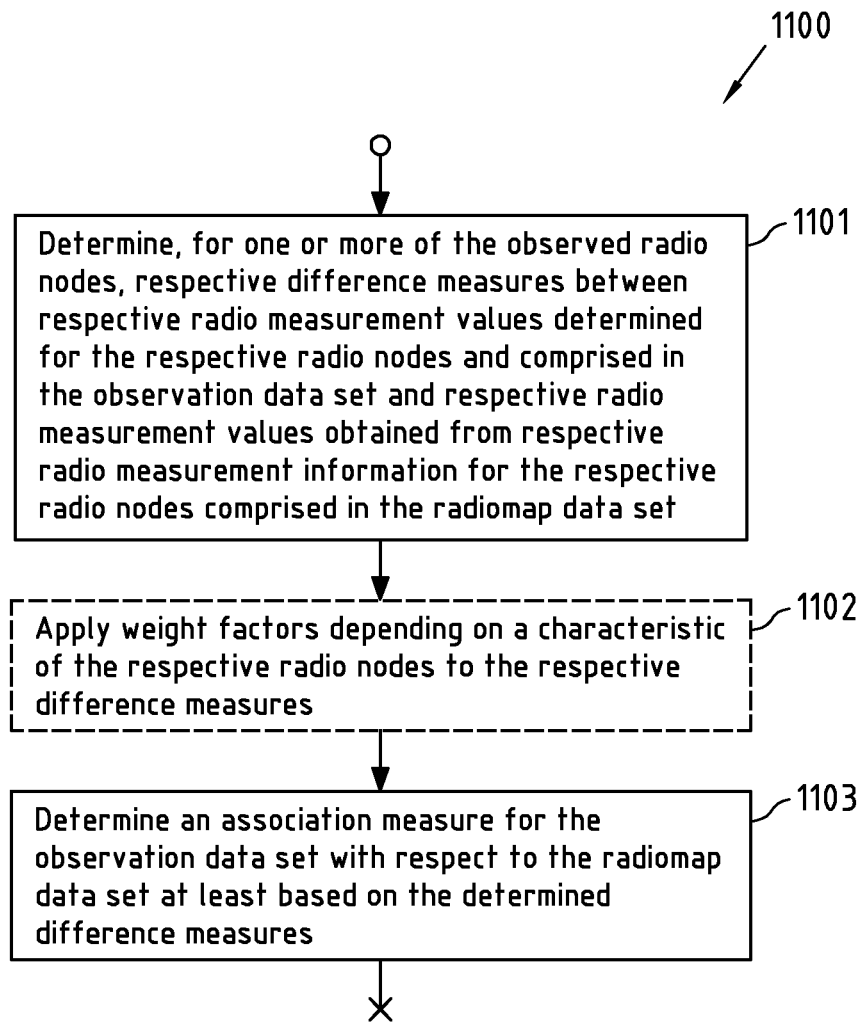
FIG. 11 is a flowchart of an example embodiment of a method for determining an association measure based on difference measures.

The radio measurement value information for the radio node comprised in the radiomap data set (see step 1101 of FIG. 11) may for instance comprise respective radio measurement values with respect to the radio node for one or more different positions on the level of the radiomap data set. These positions may for instance be positions on a grid, as already described above.

In example embodiments of the invention, the observation data set may for instance comprise or have been associated with an observation position. The observation position may for instance be comprised in the observation data set. It may then for instance have been determined by a terminal that generates the observation data set (as for instance in the scenario of FIG. 2*a*). It may for instance denote the position at which the one or more radio nodes have been observed by the terminal. Alternatively, the observation position may not be contained in the observation data set. This may for instance be the case in the scenarios of FIG. 2*b* or 2*c*, where the observation data set does not serve the purpose of updating an existing radiomap data set, but for positioning a terminal. The observation position may then be a candidate observation position of a plurality of observation positions. As further explained below, then for instance for each level of the environment and for each candidate observation position, according association measures may be determined to identify the level and the candidate observation position that yields the highest association measure. This level and candidate observation position may then constitute a three-dimensional position estimate for the terminal.

If the observation data set comprises or has been associated with an observation position, the radio measurement value obtained from the respective radio measurement value information for the radio node (see step 1101 of FIG. 1) may then for instance be obtained under consideration of the observation position. The obtained radio measurement value may for instance be the radio measurement value that is associated with a position of the one or more positions that is closest to the observation position.

In particular, in case the observation data set comprises or has been associated with an observation position, the radio measurement value obtained from the respective radio measurement value information for the radio node may for instance be a radio measurement value for a position that is, among the one or more positions, closest to the observation position or is a radio measurement value that is derived from at least a radio measurement value for a position that is, among the one or more positions, closest to the observation position.

The one or more positions may then for instance lie on a grid.

A grid point located closest to the observation position may then for instance be identifiable as a closest grid point, and, if the position of the closest grid point is a position for which the radiomap data set comprises a radio measurement value with respect to the radio node, this radio measurement value may for instance be obtained from the respective radio measurement value information for the radio node for determining the difference measure.

If the position of the closest grid point is however a position for which the radiomap data set does not comprise a radio measurement value with respect to the radio node, but if a further grid point within a pre-defined distance from the observation position or the closest grid point is a grid point with a position for which the radiomap data set comprises a radio measurement value with respect to the radio node, the radio measurement value obtained from the respective radio measurement value information for the radio node for determining the difference measure may for instance at least depend on the radio measurement value for the position of the further grid point. The further grid point may for instance be a grid point that is adjacent to the closest grid point, corresponding to a distance of one grid spacing. However, also a distance of more than one grid spacings (denoting the distance between two grid points) may be allowed, e.g. two grid spacings (i.e. the next but one grid point with respect to the closest grid point) or three grid spacings. The distance may also be defined as an absolute length (e.g. in meters) rather than in multiples of grid spacings.

The radio measurement value obtained from the respective radio measurement value information for the radio node for determining the difference measure may for instance be obtained by interpolation or extrapolation under consideration of at least the radio measurement value for the position of the further grid point, or may be obtained as the radio measurement value for the position of the further grid point itself. Interpolation may for instance be performed if at least two grid points adjacent to the closest grid point exist that have positions for which the radiomap data set comprises respective radio measurement values with respect to the radio node. The two grid points and the closest grid point may for instance all lie on a straight line, i.e. be at 9 o'clock and 3 o'clock with respect to the closest grid point or at 12 o'clock and 6 o'clock. However, alternatively, these three grid points do not have to lie on a straight line. For instance, one of the adjacent grid points may be at 12 o'clock, and the other one at 3 o'clock. Equally well, more than two adjacent grid points may be used for interpolation. An example of forming an interpolation value is forming the average over the radio measurements values associated with the adjacent grid points that shall be considered by the interpolation. Similarly, an extrapolation may be performed based on one or more radio measurement values associated with grid points that are only on one side with respect to the closest grid point, but not on the other side.

Figure 12:
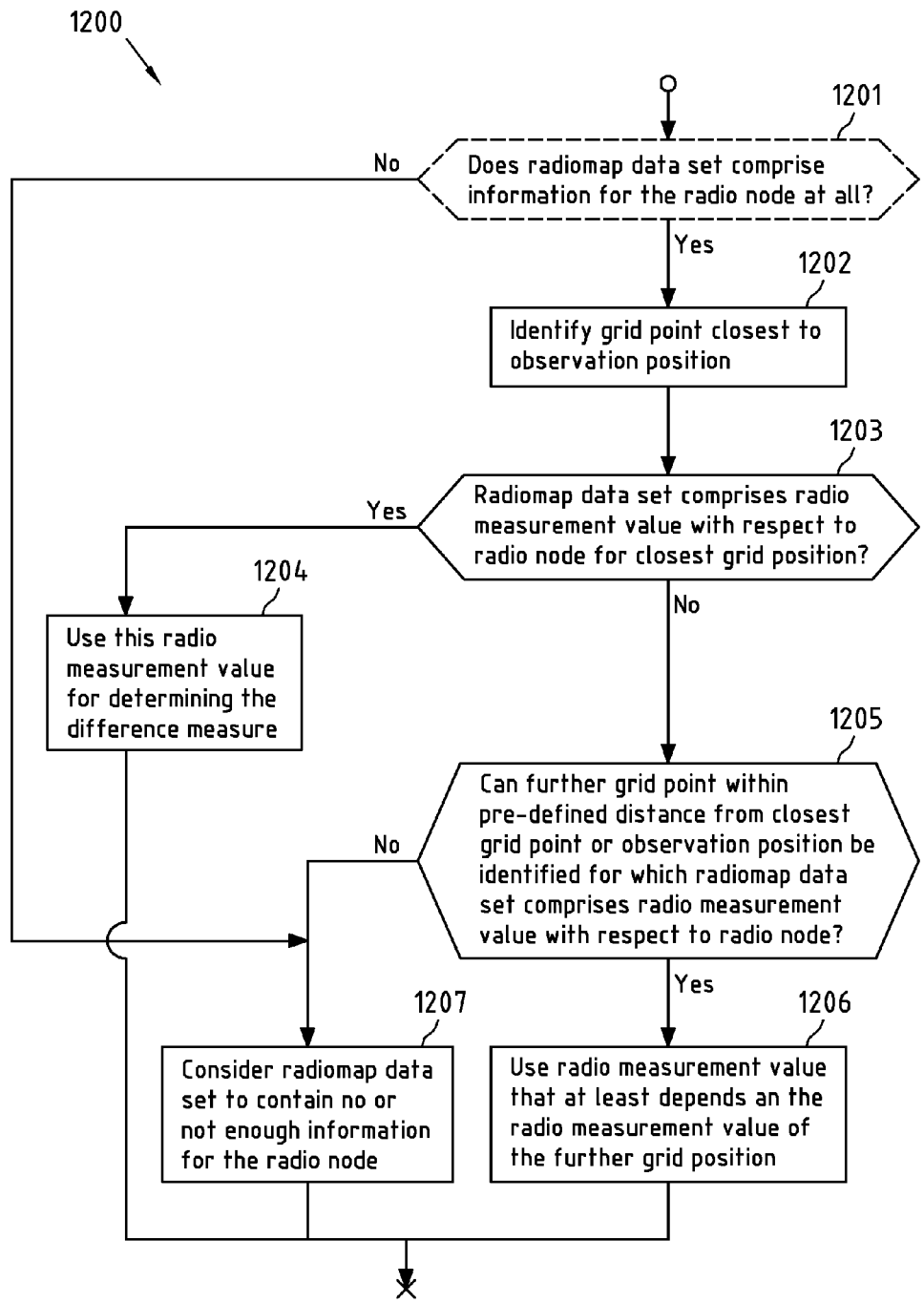
FIG. 12 is a flowchart of an example embodiment of a method for obtaining a radio measurement value for a radio node from a radiomap data set based on an observation position.

FIG. 12 is a flowchart 1200 that illustrates an exemplary process of obtaining a radio measurement value for a radio node from a radiomap data set (or from radio measurement value information comprised in the radiomap data set) based on an observation position. Therein, it is assumed that the radio measurement value information for the radio node comprised in the radiomap data set comprises respective radio measurement values with respect to the radio node for one or more different positions on the level of the radiomap data set, and that these positions lie on a grid. FIG. 12 constitutes a combination of some of the example features presented in the previous paragraphs.

In a first, optional, step 1201, it is checked if the radiomap data set comprises information for the radio node at all. If this is not the case, it will generally not be possible to obtain a radio measurement value for the radio node for calculation of the difference measure. The flowchart thus can proceed to step 1207. Step 1207 expresses that it is considered that the radiomap data set does contain no or not enough information for the radio node. This finding may for instance lead to a pre-defined penalty value being used instead of the difference measure, as will be further described below. The checking in step 1201 may for instance particularly easy when the information in the radiomap data set is organized and/or stored in a radio-node-specific-way (e.g. rather than in a grid-point-specific way), for instance as a plurality of data sets with each data set comprising a radiomodel data set for one radio node. It is then easily checked if there is a set of the radio node of interest.

If the checking in step 1201 yields a positive result, the grid point located closest to the observation position is identified in step 1202, for instance be forming the Euclidean distances between the observation position and all grid points and considering the grid point causing the smallest Euclidean distance as the closest grid point.

In step 1203, it is then checked if the radiomap data set comprises a radio measurement value with respect to the radio node for the position of this closest grid point. If this is the case, this radio measurement value is used for determining the difference measure in step 1204. Otherwise, it is checked in step 1205 if a further grid point within a pre-defined distance from the closest grid point (or observation position) can be identified having a position for which the radiomap data set comprises a radio measurement value with respect to the radio node. As already described above, this may for instance be an adjacent grid point. If this is the case, a radio measurement value that at least depends on the radio measurement value of the position of the further grid point is used for determining the difference measure. This radio measurement value may for instance be obtained at least based on the radio measurement value of the position of the further grid point by means of interpolation, extrapolation or as a simple copy. If step 1205 yields a negative result, the flowchart proceeds to step 1207, and it is considered that the radiomap data set contains no or not enough information for the radio node, which may for instance lead to a penalty value being used instead of a difference measure.

In example embodiments of the invention, the determining of the at least one of the association measures (see step 102 of FIG. 1) further comprises using, for at least one further radio node of the one or more observed radio nodes, for which further radio node the radiomap data set, with respect to which the association measure is determined, comprises no information or is considered not to comprise enough information, a pre-defined penalty value instead of a difference measure, and the association measure is determined (see step 103 of FIG. 1) based at least on the respective difference measures of the radio nodes for which a difference measure has been determined and the penalty value. As already described above (see steps 1201, 1205 and 1207 of FIG. 12), the radiomap data set, with respect to which the association measure is determined, may for instance be considered not to comprise enough information if the radiomap data set comprises respective radio measurement values with respect to the further radio node only for one or more positions on a grid that do not comprise a closest grid position that is closest to the observation position or a grid position that is within a pre-defined distance from the observation position or the closest grid point.

Thus in situations where the observation data set comprises identification information and radio measurement values for a plurality of observed radio nodes, but wherein a (level-specific) radiomap does contain no or not enough information (e.g. to allow interpolation) for at least one of these observed radio nodes, this fact has to somehow be considered in the association measure determined with respect to this radio map. Since the association measure is based on differences, and since small differences indicate good matches, it is beneficial to use, instead of an actually computed difference measure, an artificial non-zero difference measure for the at least one radio node, which is denoted as penalty value herein. This penalty value, even if the difference measures for all but the at least one of the observed radio nodes are small and actually indicate a good match of a radiomap data set to the observation data set, adversely affects the association measure for this radiomap data set and thus reflects that the overall match is not perfect and that perhaps an association value of another radiomap (and thus of another level) may be a better match for the observation data set.

Figure 13:
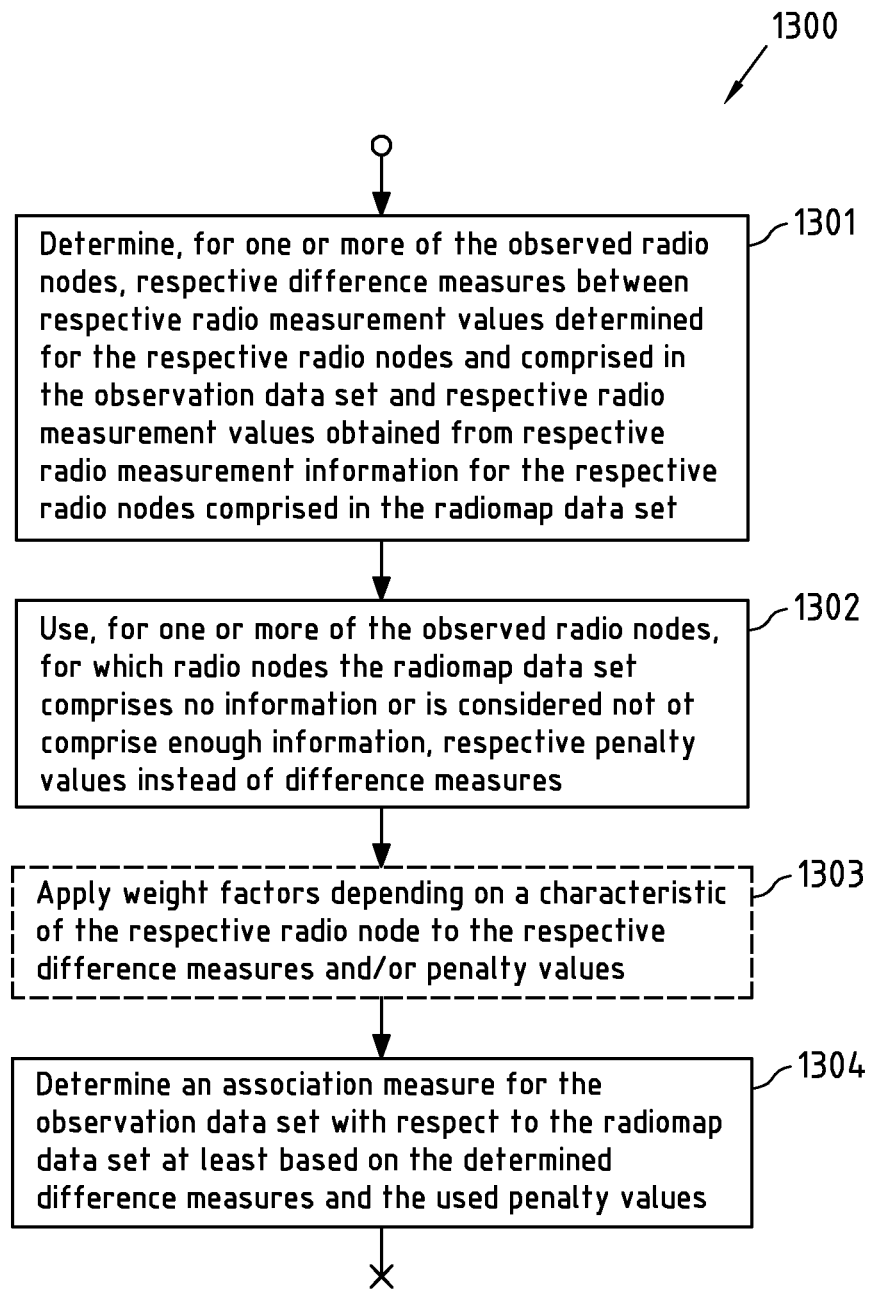
FIG. 13 is a flowchart of an example embodiment of a method for determining an association measure based on difference measures and/or penalty values.

The inclusion of penalty values in the process of determining an association measure for an observation data set with respect to a radiomap data set is illustrated in the flowchart 1300 of FIG. 13. Therein, step 1301 corresponds to step 1101 of FIG. 11. Step 1302 is a step in which penalty values are used for one or more observed radio nodes, for which radio nodes the radiomap data set comprises no information or is considered not to comprise enough information. In step 1304 then the association measure for the observation data set with respect to the radiomap data set is determined at least based on the determined differences measures and the used penalty values. Step 1303 is an optional step that is directed to the use of radio-node-specific weight factors that will be discussed below.

In example embodiments of the invention, the association measure is determined further based on one or more weight factors respectively applied to one or more of the difference measures of the radio nodes for which a respective difference measure has been determined, wherein at least one of the one or more weight factors depends on a characteristic of the radio node for which the difference measure to which the weight is applied has been determined. This is exemplarily illustrated as a step 1102 in FIG. 11, wherein the association measure in step 1103 would then be determined at least based on the determined and—if applicable— weighted difference measures (the association measure may thus be based on weighted and non-weighted determined difference measures). The weight factors may for instance be applied to all determined difference measures, or only to those radio nodes that exhibit a pre-defined characteristic (e.g. are of a pre-defined type). The weight factors may for instance be within the range from 0 to 1. The weights may be used to completely cancel any impact of a difference measure on the association measure (in particular by setting the weight to 0), or to only gradually reduce the impact of a difference measure on the association measure (e.g. by setting the weight to 0.1 or 0.5). For instance, weights applied to difference measures of nodes that have a first characteristic may be set to 0.25, and weights applied to difference measures of nodes that do not have the first characteristic or that have a second characteristic may be set to 0.75, to give but an example.

The characteristic of the radio node may for instance be a type of a radio standard according to which the radio node operates and/or a radio coverage range of the radio node and/or a transmission frequency used by the radio node and/or a transmission power used by the radio node. For instance, a WLAN radio standard and a Bluetooth radio standard may be considered as different types. Equally well, different WLAN standards (e.g. IEEE 802.11, 802.11a, 802.11b, 802.11g, 802.11n, etc.) may be considered as different types of radio standards. The radio coverage range, e.g. the range within which a radio node is able to provide radio coverage for one or more terminals, may for instance be linked to a transmission frequency used by the radio node, wherein the radio coverage range may for instance decrease with increasing transmission frequency. The radio coverage range, e.g. the range within which a radio node is able to provide radio coverage for one or more terminals, may for instance be linked to a transmission power used by the radio node, wherein the radio coverage range may for instance decrease with decreasing transmission power. The transmission frequency may for instance be a center frequency of a frequency transmission band used by a radio node. Examples of characteristics of the radio node are that the radio node is operating according to a WLAN standard (e.g. a standard of the IEEE 802.11 family of standards) at 2.4 GHz, that the radio node is operating according to a WLAN standard (e.g. a standard of the IEEE 802.11 family of standards) at 5 GHz, or that the radio node is operating according to a Bluetooth standard.

A technical effect of using weight factors depending on a characteristic of the respective radio node may for instance be that an influence of observed radio nodes with a specific characteristic on the association measure may be increased or decreased. For instance, if the characteristic is a radio coverage range, difference measures of radio nodes that have a smaller radio coverage range (e.g. use a larger transmission frequency and/or a smaller transmission power) may be weighted stronger than radio nodes that have a larger radio coverage range (e.g. use a smaller transmission frequency and/or a larger transmission power), by applying according weights to the difference measures of the radio nodes that have a smaller radio coverage range only, by applying according weights to the difference measures of the radio nodes that have a larger radio coverage range only, or by applying according weights to difference measures of the radio nodes that have a smaller radio coverage range and of the radio nodes that have a larger radio coverage range. This stronger weighting of difference measures of radio nodes that have a smaller radio coverage range emphasizes that the significance of these radio nodes for the association measure is higher than the significance of the radio nodes with the larger radio coverage range, since a terminal that observes these radio nodes with the smaller radio coverage range apparently has to be located closer to these radio nodes with the smaller radio coverage range. For instance, an estimate of a level of an environment (and/or an estimate of a two-dimensional position on this level) may be much more reliable if it is based on radio nodes with a smaller radio coverage range as compared to the case where it is based on radio nodes with a larger radio coverage range.

If one or more penalty values are used instead of difference measures (in cases where the radiomap data set does not contain or is considered not to contain enough information for allowing to determine a difference measure for an observed radio node), respective weight factors may also be applied to one or more of the penalty values. This is exemplarily illustrated as a step 1303 in FIG. 13, wherein the association measure in step 1104 would then be determined at least based on the determined (and if applicable weighted) difference measures and the used (and if applicable weighted) penalty values (the association measure may thus be based on weighted and non-weighted determined difference measures and weighted and non-weighted used penalty values). The technical effect of weighting penalty values corresponds to the technical effect of weighting difference measures, since penalty values represent artificial (predefined) difference measures.

In exemplary embodiments of the invention, the method of FIG. 1 further comprises using the estimate of the level associated with the observation data set in an updating process for at least one of the respective radiomap data sets of the two or more levels of the environment. These embodiments may for instance be deployed in the system 2a of FIG. 2a.

In the updating process, among the respective radiomap data sets of the two or more levels of the environment, for instance only the radiomap data set of the level indicated by the estimate of the level associated with the observation data set may be updated or at least considered for updating based on the observation data set. If a radiomap data set is considered for updating, there may for instance apply further conditions (e.g. if the observation data set is an outlier or is outdated, etc.) to be checked before an actual updating takes place.

The estimate of the level is thus used here to associate the observation data set to a radiomap data set that is to be updated or at least to be considered for updating based on the observation data set. The technical effect of this approach is that even in situations where the observation data set does not comprise information on the level to which the observation data set pertains, or in situations where such information is potentially erroneous, a reliable assignment of the observation set to the correct (level-specific) radiomap data set is possible.

The observation data set may for instance further comprise information on a level of the environment.

The radiomap data set of the level indicated by the estimate of the level associated with the observation data set may then for instance be updated or at least considered for updating based on the observation data set only if the estimate of the level associated with the observation data set matches the information on the level of the environment comprised in the observation data set.

Additionally or alternatively, in a case where the information on the level and the estimate of the level do not match, the observation data set is discarded, a mismatch notification is generated and/or a mismatch processing is initiated.

The technical effect of comparing the information on the level of the environment contained in the observation data set and the estimate of the level and conducting the updating process only under consideration of the result of this comparison is that even in situations where an information on the level is already available from the observation data set, a checking of the accuracy and/or reliability of this information becomes possible, and the updating of a radiomap data set based on an observation data set that actually pertains to another level and thus to another radiomap data set, which updating would deteriorate the accuracy of the erroneously updated radiomap data set, can be avoided.

Figure 14:
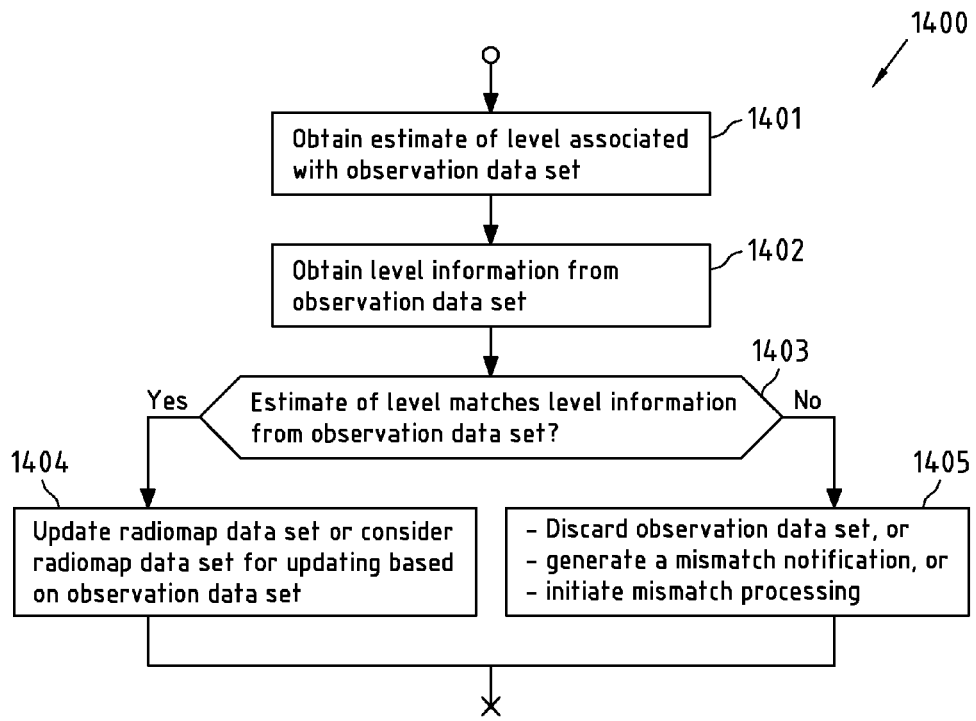
FIG. 14 is a flowchart of an example embodiment of a method for conditionally updating a radiomap data set in dependence on a comparison of an estimate of a level associated with an observation data set and an information on the level comprised in the observation data set.

FIG. 14 shows a flowchart 1400 that summarizes such a conditional updating as described in the previous paragraphs. The flowchart 1400 would for instance be performed by radiomap updating server 8 of FIG. 2a.

In a step 1401, an estimate of the level associated with the observation data set is obtained. This estimate is determined in step 103 of FIG. 1. If the flowchart 100 and the flowchart 1400 are performed by the same apparatus, the estimate of the level may for instance be passed on internally.

In a step 1402, the level information contained in the observation data set is obtained (as an example, see for instance floor ID 32 in FIG. 3).

In step 1403, it is checked if the estimate of the level matches (e.g. corresponds to) the information on the level contained in the observation data set. If this is the case, the radiomap of this level is updated or at least considered for updating in step 1404. Otherwise, the observation data set is discarded (e.g. not used for updating), and/or a mismatch notification is output (e.g. to an operator of radiomap updating server 8 of FIG. 2a, and/or to a user 4 of terminal 5 of FIG. 2a, who may be responsible for the potentially erroneous information on the level in the observation data set and may then, for future observation data sets, use a correct information on the level), and/or by initiating a mismatch processing (in which for instance the radiomap to be updated is manually selected by an operator, for instance based on the estimate of the level, in particular if the estimate of the level has achieved an association measure above a pre-defined threshold and can thus be considered more reliable than the information on the level contained in the observation data set).

An example embodiment of the invention (in the context of updating a radiomap data set, but equally well applicable, as far as the calculation of the association measure is concerned, to positioning), in which the radio measurement values are exemplarily assumed to be RSS values, in which the radiomap data set (also denoted as floor radio map) is exemplarily based on a grid, in which the difference measures are exemplarily calculated as an Euclidean norm, in which the association measure is exemplarily represented by a correlation value, in which exemplarily penalty values are used and in which weight factors are applied, then takes the following form:

The observation data set may for instance be collected by a surveyor, a voluntary end-user or by a crowd-sourcing software running as a background process in a terminal, e.g. a smartphone. The observation data sets may for instance be gathered in servers or cloud storages to be processed into radiomap data sets.

As the floor information in the observation data set can be erroneous, it is beneficial to find the best matching floor for an observation data set via a correlation process. In the following, it is assumed that the environment (e.g. a building) has more than one floor and each floor already has a radiomap with a meaningful coverage.

A correlation value between RSS values from the observation data set (containing a geo-reference representing the observation position) and respective (with (e.g. substantially) the same geo-reference) RSS-values in the floor radiomap are calculated as the inverse of the weighted Euclidean norm with penalty values for mismatching radio nodes. A weighted Euclidean norm is calculated between RSS values in the observation data set and respective RSS values in the floor radio map. This can be done as follows:

Step 1: For each radio node in the observation data set, calculate the RSS difference between the RSS value in the observation data set and the RSS value in the floor radiomap. In case the closest grid point to the geo-reference of the observation data set has been initialized in the floor radiomap (RSS value exists in floor radiomap), calculate the RSS difference between the RSS value from the observation data set and the RSS value in the floor radiomap. If the closest grid point does not have a value, the RSS difference can be calculated from the interpolated RSS value calculated from the RSS values of the neighboring grid points of the floor radiomap. If there are no near-by grid points with an RSS-value, the RSS-difference is replaced by a constant penalty value.

Step 2: Calculate the correlation value as the inverse of the weighted Euclidean norm based on the RSS-differences (calculated in the previous step) and weights assigned according to the type of the radio node (e.g. BT, WLAN 5.2 GHz, WLN 2.4 GHz). An example formula for calculating the correlation value is $$\rho_f = \frac{1}{\sum_{i=1}^{N} w_i \cdot (RSSDiff_i^f)^2},$$

where f is the index of the floor, N is the number of observed radio nodes in the observation data set, $RSSDiff_i^f$ is an RSS difference corresponding to the $i^{th}$ radio node at the $f^{th}$ floor (calculated at Step 1.), $w_i$ is a weight assigned to the $i^{th}$ radio node according to its type (BT, WLAN 5.2 GHz, WLAN 2.4 GHz). The higher the priority of certain types of radio measurements, the higher is the weight for radio nodes of that type. If all types have same priority, weights are equal and can be set to 1 or omitted.

Step 3: After the correlation value for each of the floors has been calculated, the observation data set is allocated to the floor with the highest correlation value.

Thus the correct floor for a collected observation data set can be determined by calculating the correlation value between the observation data set and an existing radiomap data set for the given floor. The correlation is calculated as a function of the number of observed radio nodes in the observation data set, RSS values and weight factors.

If a building already has a radiomap data set for a floor, the correlation value is calculated for each floor and the floor with the highest correlation (e.g. between the RSS values of the observed radio nodes and maximum RSS values) will be chosen as the floor for which the observation data set is allocated. If there is a mismatch between the floor indicated by the correlation process and the floor defined by the surveyor (and included in the observation data set), the observation data set may for instance be flagged as data that requires special handling. In case the floors match, the observation data set is accepted for processing of the corresponding radiomap data set.

A weight factor can be used to set priorities for certain types of radio measurements, e.g. Bluetooth could be weighted over WLAN, or WLAN 5.2 GHz radio nodes could be weighted over WLAN 2.4 GHz radio nodes. The weights will be used advantageously in the correlation function.

Example embodiments of the present invention thus may achieve one or more of the following technical effects. The accuracy of the radiomap-based positioning may be increased as the level wise radiomaps are based on reliable measurement data. Human errors can be mitigated in definition of the correct level for the observation data sets. Crowd-sourced observation data sets can be allocated to correct levels even if the level information was completely missing in the observation data sets (assuming radiomaps of sufficient quality already exists for the environment). Processing of large volumes of data by machines becomes possible with a high reliability and with an ability to detect mismatches As already described with reference to the systems 2b and 2c of FIGS. 2b and 2c above, the estimate of the level associated with the observation data set may not only be determined in the context of updating a radiomap data set, but also in a process of positioning, in particular in a process in which the estimate of the level is determined as part of a three-dimensional position estimate. In such a process, the observation data set produced by a terminal to be positioned (e.g. terminals 6 or 7 of FIGS. 2b and 2c) may generally not comprise an observation position (and for instance also no information on the level). Nevertheless, the above-described processes of estimating the level associated with an observation data set may nevertheless be applied in the same manner by using, instead of the observation data set, a candidate observation position that is associated with the observation data set. The candidate observation position is for instance a position from a plurality of positions, for instance all positions on a grid (in particular a grid on which one or more of the radiomap data sets for the environment are based). For each received observation data set, then for instance association measures with respect to the one or more (level-specific) radiomap data sets and with respect to each candidate observation position are determined. The association measure thus becomes both level-specific and candidate-observation-position-specific. From all determined association measures, then the association measures indicating the largest degree of association between the observation data set and the radiomap/candidate observation position is selected, and the level of the radiomap is then considered as the estimate of the level and the candidate observation position is then considered as the two-dimensional position estimate on this level. The estimated level and the estimated two-dimensional position estimate then represent a three-dimensional position estimate.

Accordingly, in example embodiments of the invention, the observation position that has been associated with the observation data set is a candidate observation position, wherein respective association measures for the observation data set are determined with respect to respective radiomap data sets of two or more levels of the environment and with respect to a respective plurality of candidate observation positions that are either the same on each level or at least partially different on at least two levels, and wherein the estimate of the level associated with the observation data set and an estimate of an observation position on this level is determined based at least on the association measures. Therein, the estimate of the level associated with the observation data set and the estimate of the observation position on this level may then for instance be determined as the level of the radiomap data set and the candidate observation position for which the association measure among the determined association measures that indicates the highest association was determined.

Figure 15:
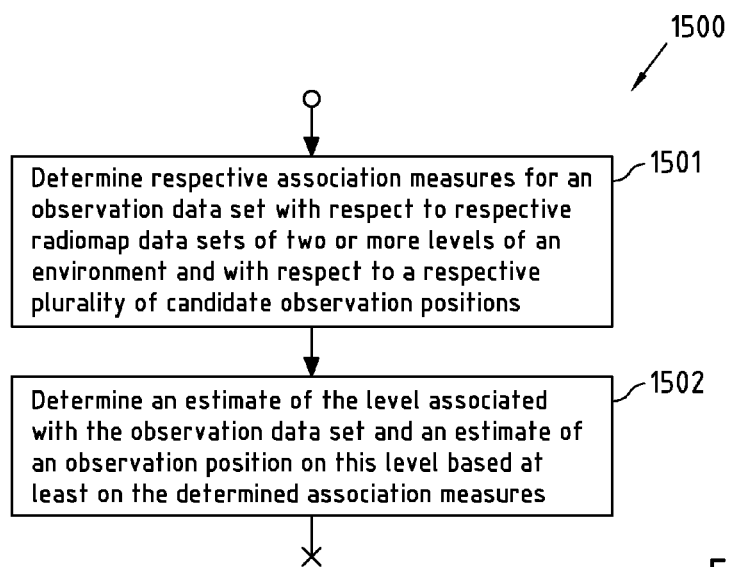
FIG. 15 is a flowchart of an example embodiment of a method for determining an estimate of a level associated with an observation data set and an estimate of an observation position on this level.

This process is illustrated by flowchart 1500 of FIG. 15, where the respective association measures are determined in step 1501 and the estimate of the level and the estimate of the observation position on this level is determined in step 1502. This process may for instance be performed by positioning server 10 of FIG. 2b or by terminal 7 of FIG. 2c.

Therein, in step 1502, either the association measures for all levels could be checked for a single candidate observation position and the association measure for the best level could be memorized before proceeding to the next candidate observation position, or the association measures for all candidate observation positions for a single level could be checked and only the association measure for the best candidate observation position be memorized before proceeding to the next level.

In the present specification, any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 51 (FIG. 5), 610 (FIG. 6), 710 (FIG. 7), 810 (FIG. 8) and 91 (FIG. 9) could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. An apparatus comprising at least one processor and at least one memory including computer program code, the at least one memory and the computer program code configured to, with the at least one processor, cause an apparatus at least to perform:
  obtaining an observation data set comprising respective identification information of one or more observed radio nodes of an environment and respective radio measurements values determined with respect to the one or more observed radio nodes,
  determining respective association measures for the observation data set with respect to respective radiomap data sets of two or more levels of the environment, wherein the radiomap data sets respectively comprise respective identification information of one or more radio nodes of the environment observable at the level of the respective radiomap data set and respective radio measurement value information for these one or more observable radio nodes, wherein determining at least one of the association measures comprises determining, for at least one radio node of the one or more observed radio nodes, a difference measure between the radio measurement value determined with respect to the radio node and comprised in the observation data set and a radio measurement value obtained from the respective radio measurement value information for the radio node comprised in the radiomap data set, and determining the association measure based at least on respective difference measures of the radio nodes for which a respective difference measure has been determined, and
  determining an estimate of a level associated with the observation data set based at least on the association measures.

2. The apparatus according to claim 1, wherein the estimate of the level associated with the observation data set is determined as the level of the radiomap data set for which the association measure among the determined association measures that indicates the highest association was determined.

3. The apparatus according to claim 1, wherein the radio measurement value information for the radio node comprised in the radiomap data set comprises respective radio measurement values with respect to the radio node for one or more different positions on the level of the radiomap data set.

4. The apparatus according to claim 3, wherein the observation data set comprises or has been associated with an observation position, and wherein the radio measurement value obtained from the respective radio measurement value information for the radio node is a radio measurement value for a position that is, among the one or more positions, closest to the observation position or is a radio measurement value that is derived from at least a radio measurement value for a position that is, among the one or more positions, closest to the observation position.

5. The apparatus according to claim 4, wherein the positions lie on a grid, and wherein a grid point located closest to the observation position is identifiable as a closest grid point, and wherein, if the position of the closest grid point is a position for which the radiomap data set comprises a radio measurement value with respect to the radio node, this radio measurement value is obtained from the respective radio measurement value information for the radio node for determining the difference measure.

6. The apparatus according to claim 4, wherein the positions lie on a grid, wherein a grid point located closest to the observation position is identifiable as a closest grid point, and wherein, if the position of the closest grid point is a position for which the radiomap data set does not comprise a radio measurement value with respect to the radio node but if a further grid point within a pre-defined distance from the observation position or the closest grid point is a grid point with a position for which the radiomap data set comprises a radio measurement value with respect to the radio node, the radio measurement value obtained from the respective radio measurement value information for the radio node for determining the difference measure at least depends on the radio measurement value for the position of the further grid point.

7. The apparatus according to claim 6, wherein the radio measurement value obtained from the respective radio measurement value information for the radio node for determining the difference measure is obtained by interpolation or extrapolation under consideration of at least the radio measurement value for the position of the further grid point, or may be obtained as the radio measurement value for the position of the further grid point itself.

8. The apparatus according to claim 1, wherein the observation data set comprises or has been associated with an observation position, and wherein the radio measurement value obtained from the respective radio measurement value information for the radio node is obtained under consideration of the observation position.

9. The apparatus according to claim 8, wherein the observation position that has been associated with the observation data set is a candidate observation position, wherein respective association measures for the observation data set are determined with respect to respective radiomap data sets of two or more levels of the environment and with respect to a respective plurality of candidate observation positions that are either the same on each level or at least partially different on at least two levels, and wherein the estimate of the level associated with the observation data set and an estimate of an observation position on this level is determined based at least on the association measures.

10. The apparatus according to claim 9, wherein the estimate of the level associated with the observation data set and the estimate of the observation position on this level is determined as the level of the radiomap data set and the candidate observation position for which the association measure among the determined association measures that indicates the highest association was determined.

11. The apparatus according to claim 1, wherein the determining of the at least one of the association measures further comprises:
  using, for at least one further radio node of the one or more observed radio nodes, for which further radio node the radiomap data set, with respect to which the association measure is determined, comprises no information or is considered not to comprise enough information, a pre-defined penalty value instead of a difference measure, and wherein the association measure is determined based at least on the respective difference measures of the radio nodes for which a difference measure has been determined and the penalty value.

12. The apparatus according to claim 11, wherein the observation data set comprises or has been associated with an observation position, and wherein the radiomap data set, with respect to which the association measure is determined, is considered not to comprise enough information if the radiomap data set comprises respective radio measurement values with respect to the further radio node only for one or more positions on a grid that do not comprise a closest grid position that is closest to the observation position or a grid position that is within a pre-defined distance from the observation position or the closest grid point.

13. The apparatus according to claim 1, wherein the association measure is determined further based on one or more weight factors respectively applied to one or more of the difference measures of the radio nodes for which a respective difference measure has been determined, wherein at least one of the one or more weight factors depends on a characteristic of the radio node for which the difference measure to which the weight is applied has been determined.

14. The apparatus according to claim 13, wherein the characteristic of the radio node is a type of a radio standard according to which the radio node operates and/or a radio coverage range of the radio node and/or a transmission frequency used by the radio node and/or a transmission power used by the radio node.

15. An apparatus comprising at least one processor and at least one memory including computer program code, the at least one memory and the computer program code are configured to, with the at least one processor, cause the apparatus at least to perform:
 obtaining an observation data set comprising respective identification information of one or more observed radio nodes of an environment and respective radio measurements values determined with respect to the one or more observed radio nodes,
 determining respective association measures for the observation data set with respect to respective radiomap data sets of two or more levels of the environment, wherein the radiomap data sets respectively comprise respective identification information of one or more radio nodes of the environment observable at the level of the respective radiomap data set and respective radio measurement value information for these one or more observable radio nodes,
 determining an estimate of a level associated with the observation data set based at least on the association measures, and
 using the estimate of the level associated with the observation data set in an updating process for at least one of the respective radiomap data sets of the two or more levels of the environment,
 wherein the observation data set further comprises an information on a level of the environment, and wherein in a case where the information on the level and the estimate of the level do not match, the observation data set is discarded, a mismatch notification is generated and/or a mismatch processing is initiated.

16. The apparatus according to claim 15, wherein the determining of at least one of the association measures comprises:
 determining, for at least one radio node of the one or more observed radio nodes, a difference measure between the radio measurement value determined with respect to the radio node and comprised in the observation data set and a radio measurement value obtained from the respective radio measurement value information for the radio node comprised in the radiomap data set, and
 determining the association measure based at least on respective difference measures of the radio nodes for which a respective difference measure has been determined.

17. The apparatus according to claim 15, wherein in the updating process, among the respective radiomap data sets of the two or more levels of the environment, only the radiomap data set of the level indicated by the estimate of the level associated with the observation data set is updated or at least considered for updating based on the observation data set.

18. The apparatus according to claim 17, wherein the observation data set further comprises an information on a level of the environment, and wherein the radiomap data set of the level indicated by the estimate of the level associated with the observation data set is updated or at least considered for updating based on the observation data set only if the estimate of the level associated with the observation data set matches the information on the level of the environment comprised in the observation data set.

19. A method comprising:
 obtaining an observation data set comprising respective identification information of one or more observed radio nodes of an environment and respective radio measurements values determined with respect to the one or more observed radio nodes,
 determining respective association measures for the observation data set with respect to respective radiomap data sets of two or more levels of the environment, wherein the radiomap data sets respectively comprise respective identification information of one or more radio nodes of the environment observable at the level of the respective radiomap data set and respective radio measurement value information for these one or more observable radio nodes, wherein determining at least one of the association measures comprises determining, for at least one radio node of the one or more observed radio nodes, a difference measure between the radio measurement value determined with respect to the radio node and comprised in the observation data set and a radio measurement value obtained from the respective radio measurement value information for the radio node comprised in the radiomap data set, and determining the association measure based at least on respective difference measures of the radio nodes for which a respective difference measure has been determined, and
 determining an estimate of a level associated with the observation data set based at least on the association measures.

* * * * *